Oct. 21, 1952 F. BARVITIUS 2,614,902
AUTOGRAPHIC RECORDER
Filed Aug. 22, 1950
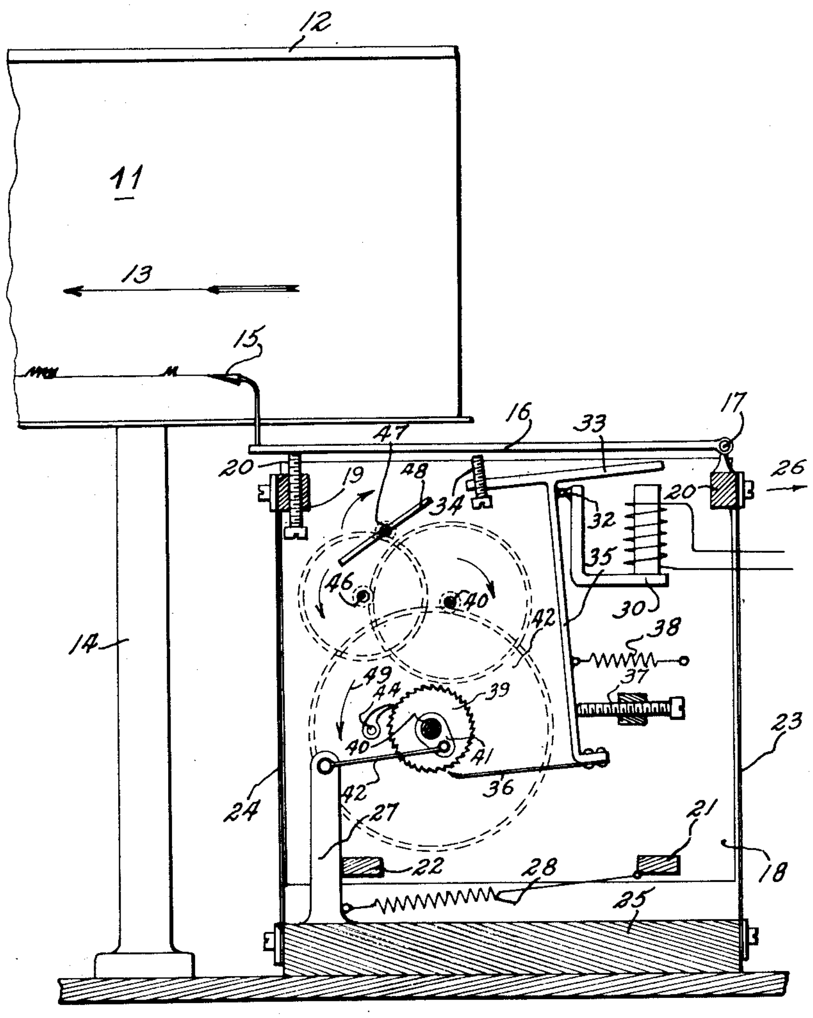
INVENTOR.
František Barvitius
BY
Pierce & Scheffler Patented Oct. 21, 1952 2,614,902

UNITED STATES PATENT OFFICE 2,614,902

AUTOGRAPHIC RECORDER

František Barvitius, Prague, Czechoslovakia, assignor of one-half to Metra, narodni podnik, Blansko, Czechoslovakia, a corporation of Czechoslovakia Application August 22, 1950, Serial No. 180,725
In Czechoslovakia September 19, 1949

5 Claims. (Cl. 346—127)

The present invention relates to autographic recorders particularly for the registration of quickly following impulses, such as for example stroke signals in mine tachographs, in which recorder the individual impulses are registered as serrations or similar markings deviating transversely from a continuous line inscribed by a writing implement upon a continuously moving record sheet.

In such recorders it is not difficult to register impulses quickly following each other, if the speed of the forward motion of the record sheet relative to the writing implement is so great that the time intervals between successive impulses will permit the record sheet to move along the writing implement for a distance sufficiently great to show clearly and distinguishably the inscribed individual serrations or other transverse deviations in spite of the heaviness of the inscribed line and of a possible blurring if ink is used. Recorders with a high speed of the record sheet can, however, not economically well be used for the registration of quickly succeeding impulses, as for example in mine tachographs as this would involve a waste of record sheet material. In said mine tachographs about three strokes per record have to be registered and to make the registration of the individual strokes legible the record sheet has to move along the writing implement at about 2.4 mm. or one tenth of an inch per second. This would require about 144 mm. or six inches of record sheet material per minute or about 207 m. or 230 yards in 24 hours. Even if the recorded line is inscribed helically upon the record sheet, for example in twelve windings in a twenty four hour period, the recorder would still require about 20 yards of record sheet material.

To avoid the said disadvantages I use in accordance with my invention a recorder in which the record sheet moves along the writing implement at a low uniform speed (for example at about 12 mm. or one-half inch per minute which speed is sufficient to register timely isolated impulses) whereas the relative speed between the record sheet and the writing implement is greatly increased when and while quickly succeeding impulses are to be recorded.

Other objects of my invention will be more fully understood from the following specification when taken with the accompanying drawing in which one embodiment is illustrated in a partly schematical sectional front view.

The record sheet 11 to be written upon by the writing implement 15 rests upon a drum 12 which rotates uniformly clockwise as indicated by the arrow 13 at a circumferential velocity of about 12 mm. or one half inch per minute and which in addition thereto moves upon its supporting post 14 axially downward so that said writing implement 15 inscribes a helical line circumferentially upon said record sheet. The drum 12 may for example complete one turn every two hours so that the helix inscribed by the writing implement 15 upon the record sheet 11 will show twelve windings in a twenty four hour period. The means to effect said composite movement of the record drum 12 are known in the art, do not form part of this invention and are not illustrated in the drawing. However, any other known devices for moving the record sheet relative to a stationary writing implement may be used in combination with my invention and the record sheet instead of performing a rotary movement may be moved straight-forward in a plane along the writing implement. The writing implement 15 is supported by a holder 16 which will permit the implement to deviate from its shown rest position transversely to the line inscribed upon the moving record sheet so that serrations as shown will appear in the inscribed line. In the illustrated embodiment said holder 16 consists of a rigid lever which supports on one of its ends the writing implement 15 and which is hinged with its other end at 17 to a frame or casing hereinafter described in detail. The required position of said holder 16 relative to said frame or casing may be set by an adjusting screw 29 mounted in the latter.

The said frame or casing comprises, for example, two parallel plates 18 of which the front plate is not illustrated in the drawing in order to show the parts mounted upon and between said plates, and these plates 18 are held together by cross bars 19, 20, 21 and 22. The said frame or casing is supported by two plate springs 23, 24 each of which is attached with its upper end to one of the cross bars 19, 20, respectively, and with their lower end to a base 25, so that said frame or casing may swing out or otherwise move laterally relative to the base 25 in the direction of the arrow 26 that is in a direction opposite to the direction of motion of the record sheet 11 as indicated by arrow 13. In the shown rest position of the frame or casing the crossbar 22 contacts a column 27 mounted upon the base 25 and the frame or casing is held in said rest position by the helical draw spring 28 which is attached with one end to said column 27 and with its other end the cross bar 21.

Mounted within said frame or casing are, first, the actuating means to effect a temporary deviation of the writing implement 15 transversely to the line inscribed upon the moving record sheet, said actuating means being responsive to transient impulses to be recorded, and second, driving means to effect the said lateral movement of the frame or casing in the direction of arrow 26 that is in a direction opposite to the direction of movement of the record sheet 11.

The said actuating means imparting said transient transverse motion to the writing implement comprise in the illustrated embodiment an electromagnet 30 which is incited by electric impulses derived from the impulses to be recorded. This electromagnet 30 rests upon a support 31 attached to one or to both frame plates 18. Cooperating with said electromagnet 30 is the armature lever 33 which is mounted on said support 31 to swing about the pivot 32. The extension of said armature lever 33 contains an adjustable push pin 34 which acts upon the holder 16 for the writing implement 15 if the armature lever 33 is drawn upon the electromagnet 30 thus effecting said transient transverse motion of the writing implement to register the incoming impulse as a serration in the line inscribed upon the record sheet.

The described actuating means for the writing implement 15 operates also the driving means effecting said swing or other lateral movement of the frame or casing. For this purpose the armature lever 33 is connected with an arm 35 which holds at its outswinging end a ratchet 36. Said arm 35 in the shown rest position contacts an adjustable stop screw 37 and is held in such contacting position by the spring 38 connected with its ends to said arm 35 and to the frame or casing, respectively. The said ratchet 36 cooperates with a ratchet wheel 39 keyed upon the shaft 40 which is rotatably mounted in said frame or casing. A crank 41 which is also keyed upon said shaft 40 is jointedly connected by a strut bar 42 to the column 27 or to any other stationary member of the device.

The mechanism described before will operate as follows:

When the armature lever 33 is swung about the pivot 32 by the magnetic force transiently excited in the electromagnet 30 then not only will the holder 16 be turned about the hinge 17 and the writing implement 15 temporarily displaced transversely to the direction of motion of the record sheet so that a serration will appear in the line marked upon the moving record sheet, but at the same time the outswinging arm 35 will force the ratchet 36 attached thereto to turn the ratchet wheel 39 with its shaft 40 and the crank 41 keyed thereupon by a certain angle in clockwise direction. The crank 41 which is linked to the strut bar 42 will force, while being turned, the shaft 40 and the frame or casing supporting the same to move laterally in the direction of the arrow 26. When the electromagnet 30 releases the armature lever 33 at the end of the impulse the spring 38 will force the arm 35 back into the shown rest position, the ratchet 36 will disengage the ratchet wheel 39 and the laterally displaced frame or casing will return to the shown rest position under the force of the plate springs 23, 24. As, however, an instantaneous return of the displaced frame or casing into its rest position is not desirable the device comprises a braking or damping device or other retarder to slow down said return movement.

Said retarder comprises in the illustrated embodiment a toothed wheel 43 which rotates freely upon the shaft 40 and which is provided with a pawl 44 engaging said ratchet wheel 39 (or better several pawls to ensure engagement in each relative position) when the same turns back in anticlockwise direction during the swing back movement of the frame or casing. Said toothed wheel 43 drives through the intermediate shafts 45, 46 each of which is provided with a pinion and toothed wheel keyed thereupon, the shaft 47 on which a winglet 48 is mounted by means of a friction clutch. It will be well understood that the toothed wheel 43 and the said gearing engaging therewith and driving the winglet 48 will be at rest when the ratchet 36 turns the ratchet wheel 39 in clockwise direction. However, as soon as the ratchet 36 releases the ratchet wheel 39 and the frame or casing starts to move back into the shown rest position as described above the pawl 44 will engage the ratchet wheel 39 and couple the same with the toothed wheel 43 which will partake in the rotation of the ratchet wheel in the direction of arrow 49 and will drive the winglet 48 at high speed. This winglet is designed according to rules well known in the art to exact a retarding resistance upon the gearing which resistance will be greatest at the beginning when the winglet starts to rotate only slowly in view of its inertia and its particular shape. Thus, the return movement of the laterally displaced frame or casing and of the writing implement 15 attached thereto towards the shown rest position will be retarded and the writing implement will, in fact, not have reached the rest position when the next of the quickly succeeding impulses causes a remagnetization of the electromagnet 30 and a repetition of the movements described above. Thus the writing implement 15 will register the impulses upon the record sheet as clearly distinguishable and mutually distanced serrations even though said impulses may follow each other very quickly. Only a longer interval between succeeding impulses will permit the frame or casing with the writing implement to return back into the shown rest position.

Although one specific embodiment of my invention has been shown and described in detail to illustrate the application of the principles of my invention it will be well understood that the same may be otherwise embodied without departing from such principles. Thus, for example, the strut bar 42 cooperating with the crank 41 may be replaced by a cam mechanism, or by a toothed rack and pinion drive, or by any other drive effecting the described swing out movement or similar lateral displacement of the frame or casing. And the winglet 48 with its driving gear may be replaced by another known braking, damping or other retarding device which will slow down the swing back movement of the frame or casing and of the writing implement mounted thereupon toward their illustrated rest position.

What I claim as my invention is:

1. In an autographic recorder particularly for recording quickly following transient impulses, the combination comprising a carrier for a record sheet, said carrier moving said record sheet uniformly in one direction, a writing implement inscribing upon said record sheet, a holder for said writing implement, a frame or casing, said holder mounted upon said frame or casing to permit the writing implement to deviate transversely to the direction of motion of the record sheet, actuating means mounted within said frame or casing to effect said transverse deviation of the writing implement, said actuating means being responsive to transient impulses to be recorded, said frame or casing being mounted for lateral displacement from a rest position in a direction opposite to the direction of motion of the record sheet, driving means mounted in said frame or casing to effect said lateral displacement thereof, said driving means being operated by said actuating means when the same respond to a transient impulse to be recorded, means to return the displaced frame or casing towards its rest position when said driving means cease to be operated and a retarder coupled with said driving means to slow down said return movement of the displaced frame or casing towards its rest position.

2. In an autographic recorder particularly for recording quickly following transient impulses, the combination comprising a carrier for a record sheet, said carrier moving said record sheet uniformly in one direction, a writing implement inscribing upon said record sheet, a holder for said writing implement, a frame or casing, said holder mounted upon said frame or casing to permit the writing implement to deviate transversely to the direction of motion of the record sheet, electromagnet actuating means within said frame or casing acting upon said holder to effect said transverse deviation of the writing implement, said actuating means being responsive to transient impulses to be recorded, said frame or casing being mounted for lateral displacement from a rest position in a direction opposite to the direction of motion of the record sheet, driving means mounted in said frame or casing to effect said lateral displacement thereof, said driving means being operated by said actuating means when the same respond to a transient impulse to be recorded, means to return the displaced frame or casing toward its rest position when said driving means cease to be operated and a retarder coupled with said driving means to slow down said return movement of the displaced frame or casing towards its rest position.

3. In an autographic recorder particularly for recording quickly following transient impulses, the combination comprising a carrier for a record sheet, said carrier moving said record sheet uniformly in one direction, a writing implement inscribing upon said record sheet, a swing lever supporting said writing implement, a frame or casing, said swing lever jointed to said frame or casing to permit the writing implement to deviate transversely to the direction of motion of the record sheet, electromagnetic actuating means within said frame or casing acting upon said swing lever to effect said transverse deviation of the writing implement, said actuating means being responsive to transient impulses to be recorded, said frame or casing being mounted for lateral displacement from a rest position in a direction opposite to the direction of motion of the record sheet, driving means mounted in said frame or casing to effect said lateral displacement thereof, said driving means being operated by said actuating means when the same respond to a transient impulse to be recorded, means to return the displaced frame or casing towards its rest position when said driving means cease to be operated, and a retarder coupled with said driving means to slow down said return movement of the displaced frame or casing towards its rest position.

4. An autographic recorder according to claim 1 wherein the driving means to effect the displacement of the frame or casing comprise a ratchet wheel operated by said actuating means for the writing implement, a shaft driven by said ratchet wheel, a crank arm upon said shaft, and a stationary member abutting against the free end of said crank arm to laterally displace said shaft and the frame or casing connected therewith away from said stationary member in a direction opposite to the direction of motion of the record sheet while the ratchet wheel is being turned by said actuating means for the writing implement.

5. An autographic recorder according to claim 1 comprising a resilient support for the frame or casing permitting the said lateral displacement thereof and forcing the following return movement thereof towards its rest position.

FRANTIŠEK BARVITIUS.

REFERENCES CITED

The following references are of record in the file of this patent:

UNITED STATES PATENTS

| Number | Name | Date |
|---|---|---|
| 1,098,521 | Nelson | June 2, 1914 |
| 1,913,200 | Hathaway | June 6, 1933 |